(12) United States Patent
Frangie

(10) Patent No.: US 8,444,374 B2
(45) Date of Patent: May 21, 2013

(54) IMPULSE HYDRO ELECTRIC TURBINE COMPRISING ROTATING NOZZLES

(76) Inventor: Nabil Frangie, Montreal (CA)

( * ) Notice: Subject to any disclaimer, the term of this patent is extended or adjusted under 35 U.S.C. 154(b) by 586 days.

(21) Appl. No.: 12/741,170

(22) PCT Filed: Oct. 31, 2008

(86) PCT No.: PCT/CA2008/001897
§ 371 (c)(1),
(2), (4) Date: May 3, 2010

(87) PCT Pub. No.: WO2009/059398
PCT Pub. Date: May 14, 2009

(65) Prior Publication Data
US 2010/0237622 A1    Sep. 23, 2010

(30) Foreign Application Priority Data
Nov. 5, 2007   (CA) .................................. 2604610

(51) Int. Cl.
*F03B 1/00* (2006.01)

(52) U.S. Cl.
USPC .............. 415/80; 415/63; 415/143; 416/20 R; 416/197 B

(58) Field of Classification Search
USPC ...... 415/63, 69, 80, 101, 143, 167; 416/20 R, 416/128, 197 B
See application file for complete search history.

(56) References Cited

U.S. PATENT DOCUMENTS

| | | | |
|---|---|---|---|
| 36,164 A * | 8/1862 | Monson | 415/80 |
| 171,256 A * | 12/1875 | Backus | 415/63 |
| 396,318 A * | 1/1889 | Wolfe | 415/63 |
| 2,060,414 A | 11/1936 | Fladeland | |
| 3,589,840 A * | 6/1971 | Murphy | 417/406 |
| 3,854,841 A * | 12/1974 | Eskeli | 415/81 |
| 3,926,534 A | 12/1975 | Erickson | |
| 5,263,814 A | 11/1993 | Jang | |
| 2004/0068975 A1 * | 4/2004 | Skowronski | 60/39.511 |

FOREIGN PATENT DOCUMENTS

JP    56034977    * 4/1981

OTHER PUBLICATIONS

Fukai, Rotary Hydraulic Machinery, Apr. 7, 1981, Abstract of JP56034977.*

* cited by examiner

*Primary Examiner* — Edward Look
*Assistant Examiner* — Liam McDowell
(74) *Attorney, Agent, or Firm* — Sofer & Haroun LLP

(57) ABSTRACT

The invention relates to a hydroelectric machine. According to the invention, the machine includes: at least two pipes (10, 11) connected to a ballast (8) and to a horizontal bar (14), bearing a vertical axis (15) driving a first gear manipulation box (25) and then the rotor of a first generator (27); blades (16) opposite the openings (12, 13) of the pipes (10, 11), carried by bearings (17) and beams (18), and by a second structure (24) via rolling bearings (22), the beams (18) leading to a hollow cylinder (31) driving, via two sprockets (28, 29) and an axis (30), a second gear manipulation box (31) and then the rotor of a second generator (33); cylindrical steel frames (38, 40, 42, 44, 47, 49) bearing shoulders and rolling bearings (39, 41, 43, 45, 46, 48, 50); a power supply for powering two needle latches (59, 60) via two concentric metal hoops (55, 56) and two brushes (57, 58).

1 Claim, 4 Drawing Sheets

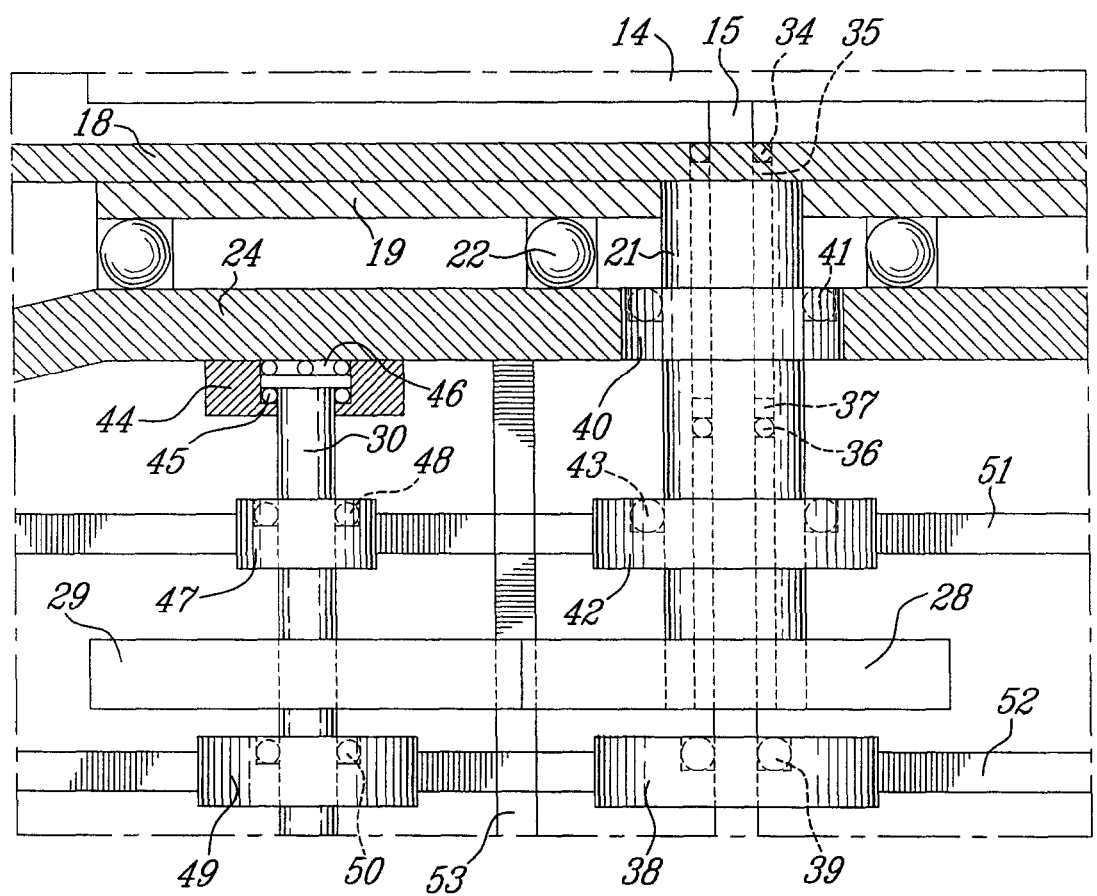
FIG_4

US 8,444,374 B2

IMPULSE HYDRO ELECTRIC TURBINE COMPRISING ROTATING NOZZLES

RELATED APPLICATIONS

This application is a National Phase application of PCT/CA2008/001897, filed on Oct. 31, 2008, which in turn claims the benefit of priority from Canadian Patent Application No. 2,604,610, filed on Nov. 5, 2007, the entirety of which are incorporated herein by reference

BACKGROUND

Description of Related Art

The increased demand for energy has driven up the cost of crude oil and has aggravated existing environmental pressures.

Renewable energy sources, be they wind powered or solar powered, are unable, for various reasons, to meet such a steep increase in demand. Nuclear power has the capability of doing so, but involves significant financial investment and runs into the problems of safety and lack of popularity which will not go away.

OBJECTS AND SUMMARY

The present invention sets out to offer a machine which produces electrical current at a relatively modest price and without harming the environment.

The machine according to the invention aims to produce electrical current making simultaneous use of the properties of a jet of water leaving the orifice of a pipe at a certain velocity after having been collected at a certain height, ranging, for example, from fifty to one thousand five hundred meters. The water thus leaving the orifice of a pipe has two forces: a reaction force, as it leaves the pipe, and an impulse force as the same water strikes the blades of a turbine. It is this second property that is put to use in electricity production plants that use Pelton turbines, for example.

The machine according to the invention comprises a first rotary assembly made up of at least two horizontal pipes, extending in two diametrically opposed directions, and elbowed at their ends such that the water jets leaving their orifices leave in two, opposite and parallel, directions. Horizontal pipes are secured to a ballast intended to slow the speed of the rotation caused by the water leaving the orifices of these pipes at a certain velocity. Likewise, these horizontal pipes are secured to a bar which passes under them and which at its center carries a shaft which extends downward at right angles and meets a step-up gearbox the output shaft of which drives the rotor of a first generator.

Furthermore, the machine according to the invention comprises a second rotary assembly made up of blades, directed toward the inside of the circle that they form. These blades are carried by supports, themselves carried by spokes extending toward the center of the circle formed by the blades. A small distance away from this center, the spokes carry a hollow cylinder which extends downward at right angles. This hollow cylinder, which is fairly wide so as to allow the shaft carried by the horizontal bar to pass through it, has at its lower end a first gearwheel which drives a second gearwheel the shaft of which enters a second step-up gearbox the output shaft of which drives the rotor of a second generator.

Finally, the machine according to the invention comprises means for stabilizing the various shafts it contains and means for supplying electrical current.

BRIEF DESCRIPTION OF THE DRAWINGS

The figures of the appended drawing will make it easy to understand how the invention may be achieved. It should be emphasized that, because of the very high number of possible embodiments of the machine according to the invention, these figures do not depict the design to a given scale. What this then means is that the figures of the attached drawing depict the machine according to the invention in a schematic and complete manner without bowing to the constraints of a particular installation.

FIG. 4 is an enlargement of detail "A" outlined in dotted line in FIG. 2; it shows details of the systems used to attach and stabilize the shafts used in the machine according to the invention.

DETAILED DESCRIPTION

Figure 1:
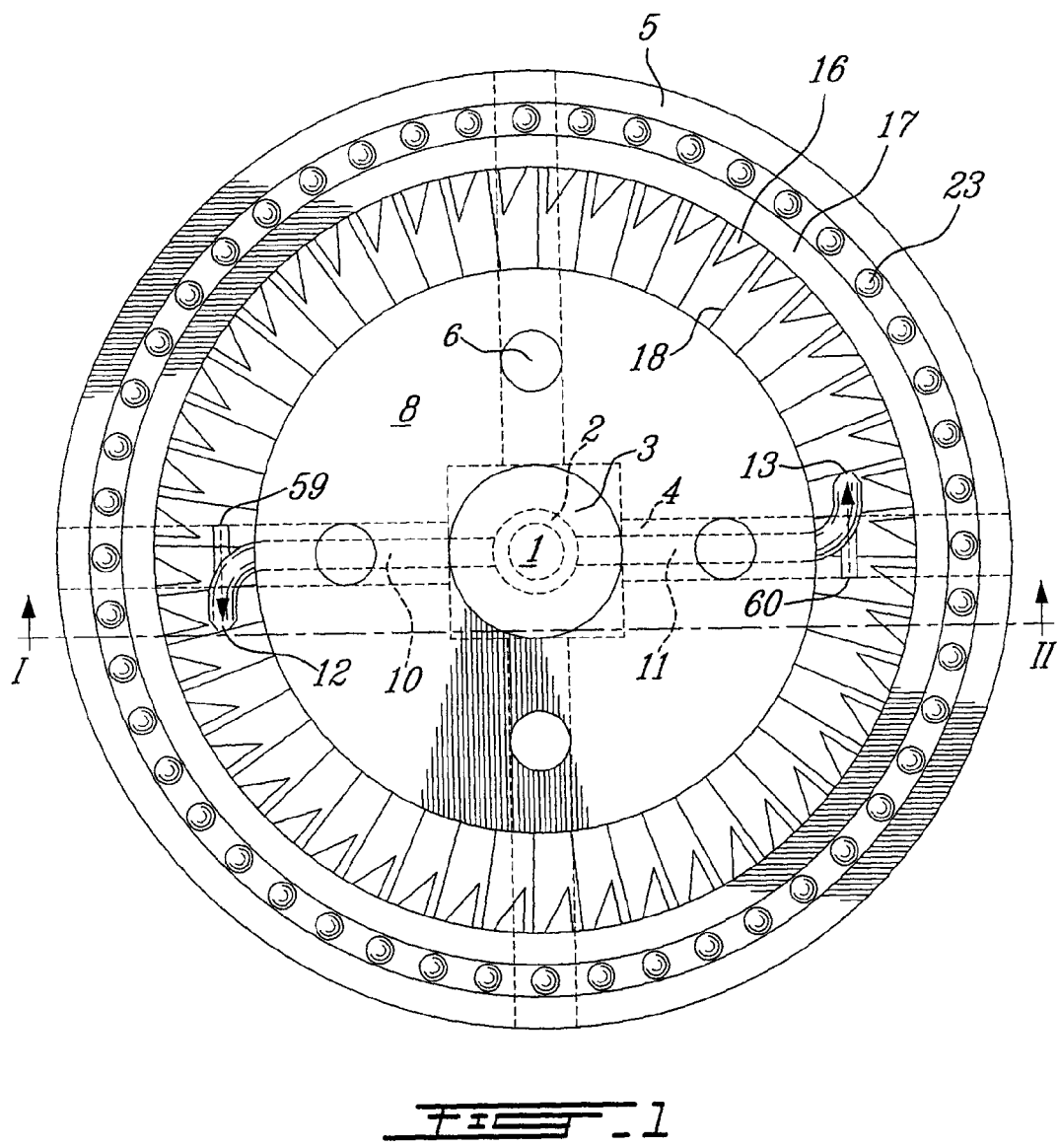
FIG. 1 is a view of the machine according to the invention, from above.

The machine according to the invention comprises a water inlet pipe 1 (FIGS. 1, 2) for water collected at a sufficient height to operate a Pelton turbine. The pipe 1 is fixed. On arriving in the machine according to the invention, the pipe 1 is extended by a rotary seal 2 which is carried by a support 3 that rests of four beams 4, for example made of steel, themselves supported by a first structure 5 that is cylindrical at least in its upper part. This first structure may be made of steel for example. The number of pipes or beams is nonlimiting.

Extending downward over a short distance from the beams 4 (FIG. 2) there are four columns 6 the widened bases of which form a circular ring 7. On its inner and outer edges, this circular ring 7 carries ballast 8 the bracket-shaped arms of which close over rolling bearings 9. These rolling bearings 9 have the function of minimizing friction when the machine according to the invention is running, and of bearing load. As a result, the rolling bearings 9, and all the other rolling bearings used in the machine according to the invention, may be ball bearings, needle bearings or alternatively roller bearings.

On leaving the rotary seal 2 (FIGS. 1, 2) the water conveyed by the pipe 1 is carried along two other pipes 10, 11 (FIGS. 1, 2) which start out vertical and are then bent for a first time at a right angle (FIG. 2) to become horizontal and extend in two diametrically opposite directions, then bent once again, in the same plane, at their ends, so that the outlet orifices 12, 13 of the pipes 10, 11 are directed in two parallel and opposite directions (FIG. 1). The pipes 10, 11 pass under the ballast 8 to which they are attached, and protrude beyond this ballast 8 so that the elbowed part thereof is uncovered.

Under their horizontal part, the pipes 10, 11 (FIG. 2) carry a bar 14, made of steel, for example, which is secured to them and to the ballast 8. Extending from the center of the bar 14 is a vertical shaft 15 made of steel, for example. This shaft 15 extends downward and is perpendicular to the bar 14.

In addition, the pipes 10, 11 carry, to the rear of the two horizontal elbows that terminate at the orifices 12, 13 (FIG. 1), electric motors 59, 60 each of which actuates a needle situated in the terminal part of the pipes 10, 11 and which can be used, if needed, to close the orifices 12, 13.

Pacing the two orifices (12, 13) (FIGS. 1, 2) of the pipes 10, 11 are blades 16. These blades 16 are identical to those fitted to Pelton turbines, that is to say are formed of two spoon-shaped halves connected along their longest edge. The jet of water thus strikes the ridge thus formed in a path perpendicular to said ridge. In addition, these blades 16 face toward the inside of the circle that they form, that is to say that the cutouts separating their two halves are directed toward the center of the circle formed by the blades 16 rather than outward.

Figure 2:
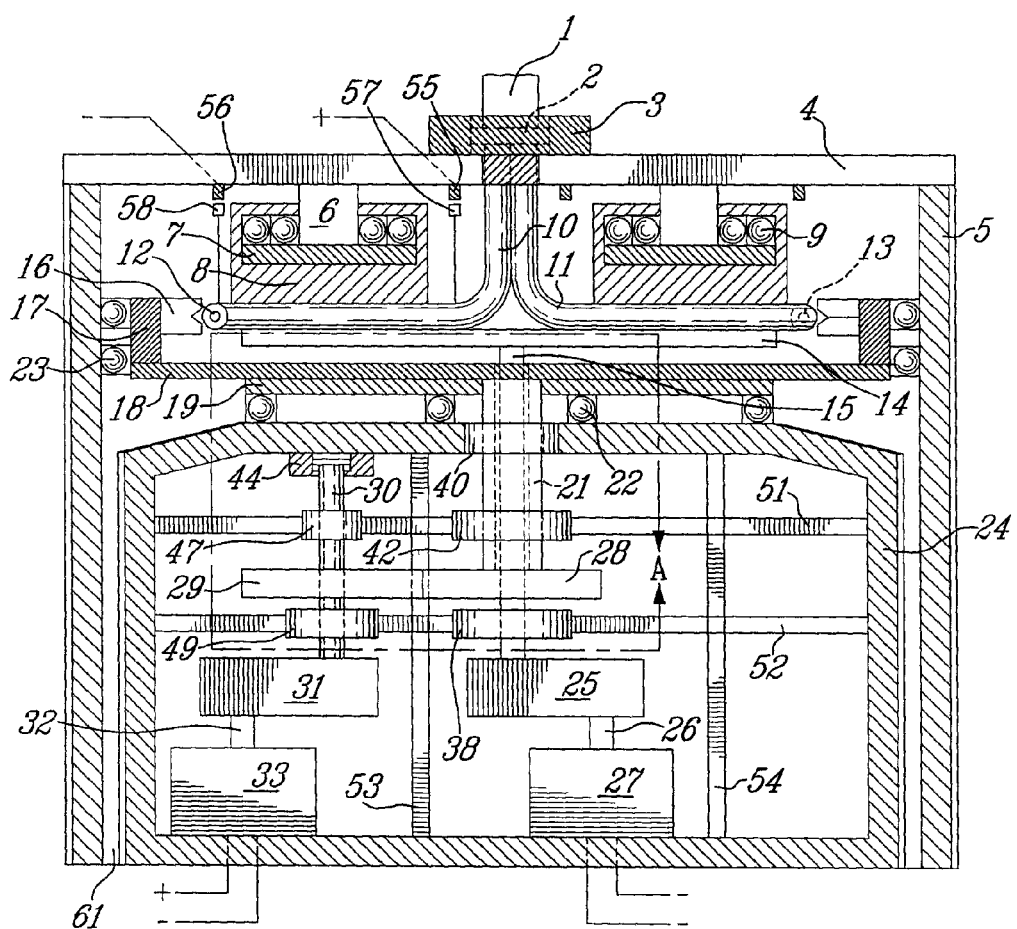
FIG. 2 depicts a view of the machine according to the invention in section on I-II of FIG. 1. It should be noted that there are certain elements that have not been depicted in this figure, for example two columns, the presence of which would do nothing but clutter a figure that already contains a good deal of detail.
Figure 3:
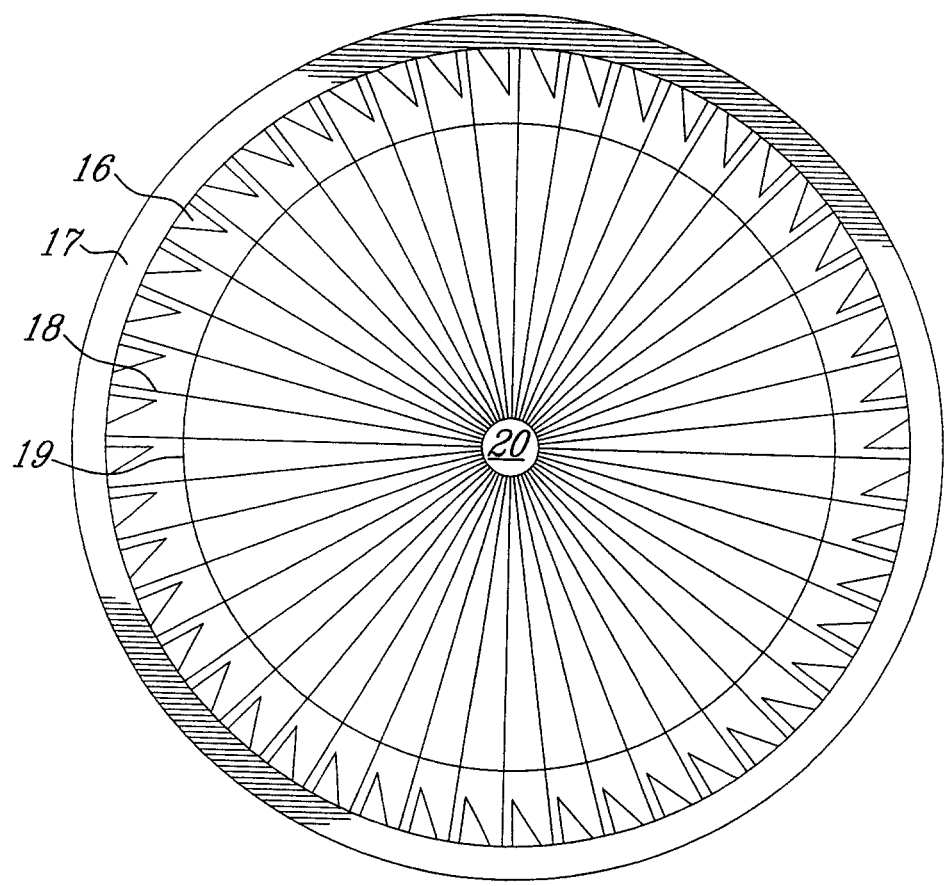
FIG. 3 depicts the way in which the blades, the supports and the spokes used in the machine according to the invention are arranged.

The blades 16 are carried by supports 17 (FIGS. 1, 2, 3), which, joined together by welding, for example, form a circle (FIGS. 1, 3). Between the supports 17 and the first structure 5 there are rolling bearings 23 (FIGS. 1, 2). The supports 17 are carried by spokes 18 (FIGS. 1, 2, 3) which converge toward the center of the circle formed by the supports, without actually reaching this center. Over most of their length, starting from the center of the circle toward which the spokes 18 converge, these spokes 18 are carried by a circular ring 19 (FIGS. 2, 3) made, for example, out of steel.

The small circle 20 (FIG. 3) of the circular ring 19 carries a hollow cylinder 21 made, for example, of steel (FIG. 2), which is attached orthogonally to the circular ring 19 and extends downward. The diameter of this hollow cylinder 21 needs to be fairly large so as to allow the shaft 15 to pass freely through it and also to contain the interior shoulders and the rolling bearings intended to facilitate the simultaneous (and in opposite directions) rotation of the shaft 15 and of the hollow cylinder 21.

The circular ring 19 is carried by concentric rolling bearings 22 (FIGS. 2, 4) which facilitate its rotation and ensure its stability. The rolling bearings 22 are themselves carried by a second structure 24 (FIGS. 2, 4) made, for example, of steel. The second structure 24 is contained within the first structure 5; it is of cylindrical shape with a horizontal roof supporting the rolling bearings 22. The junction between the vertical part and the horizontal part of the structure 24 (FIG. 2) is not at right angles but in the form of a small part of the roof which slopes toward the vertical part. The roof of the second structure 24 is pierced with a circular opening large enough to allow the hollow cylinder 21 to pass through it and also large enough to contain a fixing element discussed in greater detail later on.

At its lower end, the shaft 15 (FIG. 2) enters a first step-up gearbox 25, the support of which is not shown, and which via a shaft 26 drives the rotor of a first generator 27. The elements that are intended to stabilize the various shafts used in the machine according to the invention will be discussed later on.

As for the hollow cylinder 21, it at its lower end carries a first gearwheel 28 (FIG. 2). The first gearwheel 28 drives a second gearwheel 29 which is secured at its center to a shaft 30 supported by a device that will be explained later on. The shaft 30 drives a second step-up gearbox 31, the support of which is not shown, and which in turn, and via a shaft 32, drives the rotor of a second generator 33.

The various shafts used in the machine according to the invention and which work together to produce electrical current are stabilized as follows. It should be noted that the various shoulders and rolling bearings used for this purpose, although contained inside steel frameworks, are depicted in continuous line, to make the figures easier to understand.

The shaft 15 (FIG. 4) is guided in its rotation, inside the hollow cylinder 21, by two rolling bearings; a rolling bearing 34 carried by an interior shoulder 35, and another rolling bearing 36 forced against another interior shoulder 37.

In addition, once it leaves the hollow cylinder 21, the shaft 15 is held in position by a cylindrical steel framework 38 (FIG. 4) which contains an interior shoulder and a rolling bearing 39.

As for the hollow cylinder 21, it is stabilised as follows. In the roof of the second structure 24, the hollow cylinder 21 enters a cylindrical steel frame 40 (FIG. 4) containing an interior shoulder and a rolling bearing 41. In addition, and before reaching the first gearwheel 28, the hollow cylinder also passes through another cylindrical steel framework 42 which likewise contains an interior shoulder and a rolling bearing 43.

As for the shaft 30 (FIG. 4), it is supported as follows. The upper end of the shaft 30 ends in the form of a flat-head nail. This flattened head sits in a cylindrical steel framework 44 containing an interior shoulder supporting a rolling bearing 45. Furthermore between the flattened end of the shaft 30 and the roof of the second structure 24 there is a thrust ball bearing 46, for example, which facilitates rotation of the shaft 30. It is probable that the various components of this fastening will need to be assembled with one another before being installed.

Then the shaft 30, before entering the second gearwheel 29 to which it is attached, passes through a cylindrical steel framework 47 which contains an interior shoulder and a rolling bearing 48. Likewise, having left the second gearwheel 29, and before entering the second step-up gearbox 31, the shaft 30 passes through another cylindrical steel framework 49 which contains an interior shoulder and a rolling bearing 50.

The cylindrical steel frameworks 42, 47 are supported by a horizontal steel bar 51 attached to the walls of the second structure 24. The cylindrical steel frameworks 38, 49 are supported by another horizontal steel bar 52, parallel to the bar 51, positioned below the latter, and likewise attached to the walls of the second structure 24.

The two horizontal steel bars 51, 52 in their turn are reinforced by two vertical steel bars 53, 54 (FIG. 2) extending from the roof to the floor of the second structure 24.

Finally, the machine according to the invention also comprises:
- two metal hoops 55, 56 (FIG. 2) fastened to the beams 4, with the necessary insulation, that two metal brushes 57, 58 face in order to receive electrical current from an electrical current source, (not shown) with a view to supplying electrical current, via electric cables (likewise not shown), to the needle-operated shut-off systems 59, 60 carried by the pipes 10, 11 behind their horizontal elbow (FIG. 1);
- openings 61 (FIG. 2) situated between the first structure 5 and the second structure 24, at ground level, allow the water used while the machine according to the invention is running to be discharged through the pipelines, the flow of which water will have been made easier by the inclined part of the second structure 24.

The machine according to the invention works as follows. The water, picked up at sufficient height to operate a Pelton turbine, reaches the machine according to the invention via the fixed pipe 1. It then passes through the rotary seal 2 and then enters the pipes 10, 11. On leaving the orifices 12, 13 of these pipes 10, 11 in two parallel and opposite directions, the water causes the pipes 10, 11 and the ballast 8, the horizontal bar 14 and the vertical shaft 15 that this bar 14 carries at its center, to rotate. The pipes 10, 11, the ballast 8, the horizontal bar 14 and the shaft 15 form the first rotary system.

At the same time, the water leaving the orifices 12, 13 of the pipes 10, 11 at a certain velocity strikes the blades 16 and causes the elements dependent on these blades 16, namely the supports 17, the spokes 18 with the circular ring 19 and the hollow cylinder 21 perpendicular thereto to rotate. The blades 16, the supports 17, the spokes 18 with the circular ring 19 and the hollow cylinder 21 form the second, rotary system.

However, because the two rotary system rotate in opposite directions, it is necessary for the first of these systems to be slowed, while maintaining its power, so that the second system can benefit effectively from the water jets emanating from the orifices 12, 13 of the pipes 10, 11. That is the function of the ballast 8 carried by the platform 7 of the column 6 via the rolling bearings 9. This ballast 8 has to be heavy enough that the first rotary system acquires a uniform and slow circular motion. An analogy might be the rotational speed of the rotors of large wind turbines which produce electrical current in an operating range from 9 to 19 revolutions per minute.

With the rotational speed of the first rotary assembly slowed, the water jets leaving the orifices 12, 13 of the pipes 10, 11 strike the blades 16 with greater force, increasing the electricity production of the second rotary assembly.

When the first rotary system is rotating under the effect of the water leaving the pipes 10, 11, the shaft 15 which forms part of the first system also rotates and the first step-up gearbox 25, in which the shaft 15 terminates, steps up the rotational speed of its output shaft 26 to the desired level. Because the shaft 26 is secured to the rotor of the first generator 27, its rotation leads to a first production of electrical current.

Further, when the second rotary system is rotating, the hollow cylinder 21 that forms a part thereof also rotates and causes the first gearwheel 28 to which it is secured to turn. By turning, this first gearwheel turns the second gearwheel 29, and the shaft 30 which is secured to it and which terminates in the second step-up gearbox 31. This second step-up gearbox 31 steps up the rotational speed of its output shaft 32 to the desired level. Because the shaft 32 is secured to the rotor of the second generator 33, its rotation causes a second production of electrical current.

Thus, under the effect of the same jet of water, the two rotary systems, which are independent of one another, each produce electricity.

The total production of electrical current of the machine according to the invention is equal to the sum of the electricity production of the two generators 27, 33.

The embodiments of the invention, for which an exclusive right of ownership or privilege is claimed, are defined as follows:

1. An electric machine, comprising:
   two separate rotary assemblies, rotating simultaneously in two opposite directions under an effect of one and a same jet of water:
      a first assembly, supported by a first structure that is cylindrical at least in an upper part and that is made of steel, and comprising platforms carried, via rolling bearings, by columns extending down from beams; and supporting pipes, supplied with water by a water inlet pipe, equipped with a rotary seal, the supporting pipes are bent in a horizontal part to orient jets of water emerging from respective orifices in two parallel and opposite directions, the supporting pipes being secured to ballasts and to a steel bar, a center of the steel bar carries a steel first shaft extending at right angles downward to drive a first electric generator;
      a second assembly, carried by a second structure, contained within the first structure and carrying rolling bearings on which there rotates a circular metal ring supporting spokes over most of a length of the spokes from a center thereof, supports are attached to said spokes and are joined together in a circle, said supports rest via rolling bearings on a vertical wall of the first structure and carry blades that are directed toward a center of a circle that the blades form, the blades are situated facing a corresponding orifice of the supporting pipes, fixed at right angles to a central circle of the circular ring is a hollow cylinder which extends downward and drives a second electric generator;
         the hollow cylinder has an internal diameter large enough to allow the first shaft to pass freely there through and to house internal shoulders and rolling bearings that guide rotation of said first shaft, the hollow cylinder passing through a roof of the second structure via a circular opening at a center thereof that is large enough to contain a cylindrical steel element carrying a rolling bearing, the roof of the second structure being connected to a vertical body of the second structure by slight inclines near edges thereof;
         the first shaft driving a first step-up gearbox an output shaft of which drives a rotor of the first electric generator;
         the hollow cylinder drives a first gearwheel which in turn drives a second gear wheel secured to a second shaft having a flattened top, the flattened top is carried by a cylindrical steel element attached to the roof of the second structure via an interior shoulder and a rolling bearing, a thrust ball bearing separates the flattened top of the second shaft from the roof of the second structure;
         the second shaft in turn drives a second step-up gearbox an output shaft of which drives a rotor of the second electric generator;
   stabilizing means comprising:
      a first horizontal bar intended to ensure stability of a first framework and a second framework, the first framework comprising a first rolling bearing intended to guide rotation of the hollow cylinder, and the second framework comprising a second rolling bearing intended to guide rotation of the second shaft;
      a second horizontal bar intended to ensure stability of a third framework and a fourth framework, the third framework comprising a first rolling bearing intended to guide rotation of the first shaft, and the fourth framework comprising a second rolling bearing intended to guide rotation of the second shaft;
      vertical bars which enhance stability of the first horizontal bar and the second horizontal bar;
   electrical means connected to two conductive metal rails carried under the beams and with which metal brushes carried by rods mounted on one of the supporting pipes are in contact in order to power needle-type shutoff systems located behind horizontal elbows of the supporting pipes;
   openings situated between the first structure and the second structure, at ground level, allow water in use to be discharged.

* * * * *